J. R. CROSS.

Assignor to H. H. Bliss.

PACKING FOR OIL-WELLS.

No. 7,772. Reissued July 3, 1877.

Witnesses
Jamy Orth
F. G. Doubleday

Inventor
John R. Cross
by H. H. Bliss
atty.

UNITED STATES PATENT OFFICE.

JOHN R. CROSS, OF CLEVELAND, OHIO, ASSIGNOR TO H. H. BLISS, OF CHESTER, PENNSYLVANIA.

IMPROVEMENT IN PACKING FOR OIL-WELLS.

Specification forming part of Letters Patent No. 46,217, dated February 7, 1865; Reissue No. 7,772, dated July 3, 1877; application filed May 1, 1877.

*To all whom it may concern:*

Be it known that I, JOHN R. CROSS, of Cleveland, in the county of Cuyahoga and State of Ohio, have invented certain new and useful Improvements in Packing for Artesian Oil-Wells; and I do hereby declare that the following is a full, clear, and exact description thereof that will enable others skilled in the art to which it appertains to make and use the same, reference being had to the accompanying drawings, and to the letters of reference marked thereon, which form a part of this specification.

Figure 1:
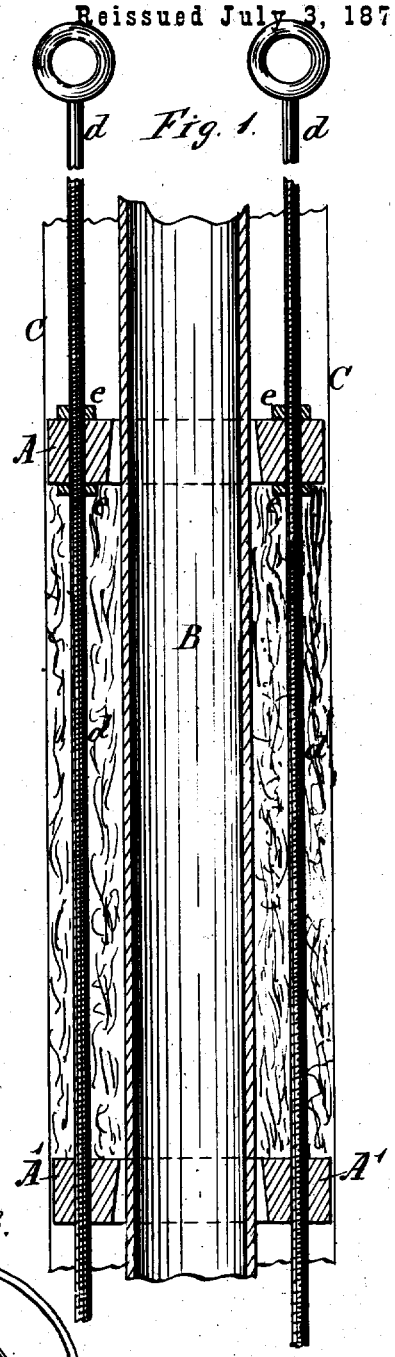
Figure 2:
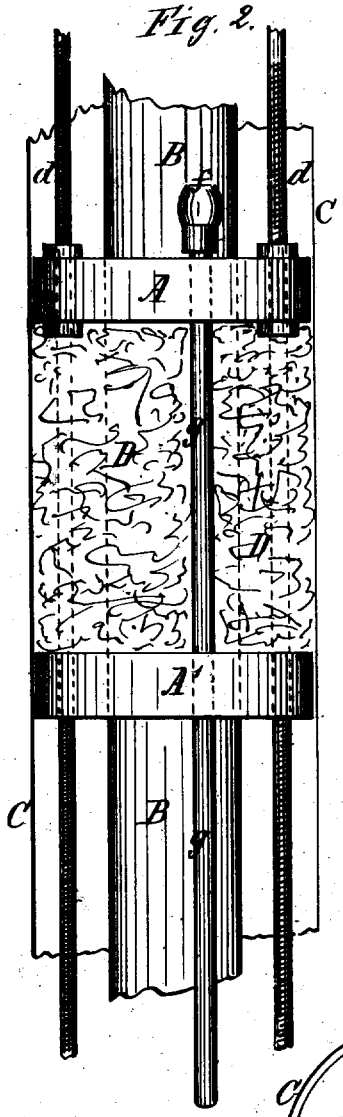
Figure 3:
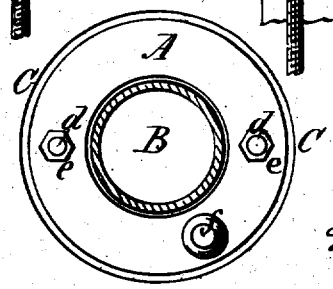

Figure 1 is a vertical section of a portion of an artesian well with the packing, the same being represented as not compressed. Fig. 2 is an elevation of the same with the packing compressed. Fig. 3 is a horizontal cross-section of a well immediately above the packing.

Prior to the grant of my patent three methods had been devised for packing the annular space between the discharge pipe or tubing and the wall in an oil-well.

One of these earlier packers consists of a leather bag secured at top and bottom to the tubing, and filled with flax-seed, which seed becomes wet, swells, and fills tightly the space within the bag, and presses the bag firmly against the wall of the well.

A second method is that shown in patent to H. W. Spooner, February 26, 1861, consisting of a sleeve band or strip of leather, rubber, or other elastic material surrounding the tube, and secured thereto at its upper and lower edge, in combination with a device arranged within the tube to force liquid through the tube into the space inclosed between the elastic band and tube, thus distending the central portion of the band, and pressing it against the wall of the well.

A third combination had been devised by Owen Redmond, as shown in his patent of October 30, 1866, in which a short supplemental cylinder surrounding the discharging-tube is employed, in combination with a flexible or yielding packing material, which is pressed against the wall of the well by means of a metal piece actuated by a screw-thread, and other devices arranged outside of the discharging-tube.

One serious objection to the Spooner packer is that the devices within the tube prevent the introduction of the sucker-rods to a point below said devices.

A defect in the Redmond packer is this: it necessitates the use of two packings, one to close the space between the tubing and the cylinder which surrounds the tubing, and another packing to close the space between this cylinder and the wall of the well.

Another defect is that he shows no means for pressing the packing against the tubing.

Another defect is that he uses a comparatively thin ring or disk of packing material, so that in case the wall of the well at the point where the packer is applied be irregular in outline, there would be a liability of leakage at some point around the circumference of the packer. But in my construction all of the above defects are obviated, and when the packing material is tightly compressed no water can flow from the upper part of the well between this material and the pumping-tube.

As represented in the drawings, my invention consists of two rings or flanges, A A′, surrounding the tube B of the well C. Two screw-rods, *d d*, usually of half an inch in diameter, pass through both flanges, the upper one being fixed in its position on said rods by means of collars *e e*, or other convenient device. The rods, however, revolve freely in this flange, but are connected with the lower one, A′, by means of screw-threads which cause it to approach or recede from the upper or stationary one, according to the direction in which the rods *d d* are turned.

The intermediate space between the two flanges and around the tube B contains a packing material of hemp, cotton-waste, wicking, threads of twine, or other fibrous and suitable material, which is capable of compression and elongation, as the space between the flanges A A′ is contracted or expanded.

This material is connected with the flanges by being passed over a wire attached to each, or through rings or holes provided for the purpose, and the strands may be crossed or interwoven to make the mass more close when compressed. Before using, it is saturated with grease, tallow, or a composition of beeswax and tallow, or other suitable substance for filling the pores and interstices between the fibers, and thus enable it to resist the passage of water.

The rods *d d* extend to top of the well, and are lengthened out as the apparatus is lowered, by adding sections thereto.

The flanges, being loose both around the tube and inside the well, readily slide up and down, and when the point where it is desired to fix the packing has been decided upon, the screw-rods *d d* are turned so as to draw the flange A′ nearer to the fixed one A, and compress the hemp or other material with great force into a dense mass, which prevents any water from passing.

If desired to alter the position of the packing, by turning the screw-rods the reverse direction the packing material is elongated, and consequently made loose, so that in two minutes the packing may be raised or lowered, as desired, and again tightened without loss of time, without drawing the tube, and even without admitting any considerable portion of the water, which stands above the packing, into the oil-chamber of the well.

The oil-tube may, with equal facility, be raised or lowered, when the packing is not compressed, thereby saving the great expense of taking it entirely out of the well, to place a new seed-bag, when any alteration is required, as has heretofore been necessary.

My packing apparatus is capable of modification without varying the principle of its construction and operation.

For instance, the tube B may be made with a slide-joint between the flanges A A′, so that when the lower end of the lower part of the tube touches the bottom of the well the weight of the upper portion will cause the joint to slide together, and thus compress the packing D in the same manner that is done by the screw-rods *d d*. When the tube is raised to withdraw it, it would, of course, loosen the packing by elongating the threads or fibers D. In this case rods or bolts would have to be used to support the weight of the lower part of the tube in drawing it out of the well.

The tube, instead of a slide-joint, might be provided with an external and internal screw of sufficient length to effect the adjustment of the packing by turning the upper portion of the tube so as to contract or elongate the space between the flanges A A′, but either of these methods would be less reliable than the described screw-rods, and not capable of adjustment to different depths in the well, except by removing the greater portion of the pipe (that above the packing) each time.

I also provide my packing apparatus with a gas-valve, *f*, on the top of the upper flanges, and connected with a tube, *g*, which extends through the packing D and the lower flange, and is made of greater length than the range of motion which the packing D permits with flange A′. If the gas which accumulates in the oil-chamber below the packing, and frequently seriously interferes with the pumping, attains a pressure greater than that of the column of water above the packing, it will raise the valve *f* and escape. At other times the valve is closed, and prevents the water from above from passing through the tube *g*.

From the above description it will be seen that there are a number of features of construction and operation in my invention not shown in packers of earlier date, among which are the following:

I am the first to employ or describe a flexible or yielding packing material, which is pressed against the wall of the well and against the tubing itself—that is, without the employment of a supplemental packing cylinder surrounding the tubing.

I am the first to describe a yielding packing which is pressed against the wall of the well by means of rings or flanges, operated in such manner that the discharging-tube supports them, and also causes one to approach the other, and thus compress the packing material.

I am also the first to describe a yielding packing supported upon the discharging-tube and compressed by the movement of said tube.

I am also the first to describe a yielding packing which is compressed by the action of the screw-threaded parts which support the packer in the well.

I am also the first to describe a packing and devices, arranged outside the tubing, which press said packing against the wall of the well without the use of a packing-cylinder which is separate and apart from the eduction-tube; hence I am enabled to dispense with the use of the second packing employed by Redmond to pack the space between his supplemental tube or packing-cylinder and his pumping-tube.

I believe that I am also the first to show or use an oil-well packer constituted, in part, of a metallic flange provided with a seat adapted to support a tube through which gas may escape from the lower part of the well.

I do not, in this patent, wish to be limited by the fibrous material shown and described, as that method or construction shown in Patent to L. L. Fox, January 10, 1865, is, as I believe, substantially the equivalent of mine in many respects.

I claim—

1. In an artesian-well packer, a flexible or yielding packing material, in combination with devices which press said material against both the wall of the well and the discharging-tube.

2. In an artesian-well packer, the combination, with the discharging-tube, of a flexible or yielding packing material, and two flanges or disks which approach each other, and compress the yielding packing material between them.

3. In an artesian-well packer, the combination of two flanges surrounding the discharging-tube, a yielding packing material arranged between the flanges, and screw-threads for causing one flange to approach the other to compress the packing material.

4. In an artesian-well packing, a fibrous material, connected to movable rings, which compress the packing when they approach each other, and which elongate said packing when they recede from each other.

5. In an artesian-well packer, a flexible or yielding packing material, in combination with a flange adapted to surround the discharging-tube, and also provided with a seat adapted to receive and support a gas-escape-pipe.

In testimony that I claim the foregoing I have hereunto set my hand this 23d day of April, 1877.

JOHN R. CROSS.

Witnesses:

ROBERT R. SMITH,
H. H. BLISS.